(12) United States Patent
Tanaka

(10) Patent No.: US 10,856,318 B2
(45) Date of Patent: *Dec. 1, 2020

(54) BASE STATION, TERMINAL, AND WIRELESS COMMUNICATION SYSTEM

(71) Applicant: FUJITSU LIMITED, Kawasaki-shi (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,367

(22) Filed: May 8, 2020

(65) Prior Publication Data

US 2020/0275469 A1 Aug. 27, 2020

Related U.S. Application Data

(63) Continuation of application No. 15/703,606, filed on Sep. 13, 2017, now Pat. No. 10,681,718, which is a
(Continued)

(51) Int. Cl.
*H04W 72/12* (2009.01)
*H04W 16/14* (2009.01)
(Continued)

(52) U.S. Cl.
CPC ....... *H04W 72/1284* (2013.01); *H04W 16/14* (2013.01); *H04W 72/042* (2013.01);
(Continued)

(58) Field of Classification Search
None
See application file for complete search history.

(56) References Cited

U.S. PATENT DOCUMENTS

2009/0075668 A1 3/2009 Rao
2010/0232382 A1* 9/2010 Gauvreau ......... H04W 72/0413
370/329
(Continued)

FOREIGN PATENT DOCUMENTS

RU  2 444 132 C2   2/2012
WO  2012/040520 A1  3/2012
(Continued)

OTHER PUBLICATIONS

Fujitsu, "Design of LAA UL transmission", Agenda Item: 7.2.3.3, 3GPP TSG-RAN WG1 Meeting #80, R1-150186, Athens, Greece, Feb. 9-13, 2015.
(Continued)

*Primary Examiner* — San Htun
(74) *Attorney, Agent, or Firm* — Myers Wolin, LLC.

(57) ABSTRACT

A base station includes a licensed band transmitting unit, a determining unit, and an unlicensed band transmitting unit. The licensed band transmitting unit transmits, to a terminal, a control signal for specifying a resource in a shared band to be used for data transmission by the terminal. The determining unit determines whether the resource in the shared band is idle or busy. The unlicensed band transmitting unit transmits a permission signal for permitting transmission in the shared band when the determining unit determines that the resource in the shared band is idle. The control signal or the permission signal includes an offset indicating a time from the permission signal to a start of transmission of data from the terminal to the base station with reference to the permission signal transmitted from the unlicensed band transmitting unit.

10 Claims, 11 Drawing Sheets

Related U.S. Application Data continuation of application No. PCT/JP2015/060770, filed on Apr. 6, 2015.

(51) Int. Cl.
    *H04W 72/04*     (2009.01)
    *H04W 74/08*     (2009.01)
    *H04W 74/00*     (2009.01)
    *H04W 88/10*     (2009.01)

(52) U.S. Cl.
CPC ... *H04W 72/0453* (2013.01); *H04W 72/1268* (2013.01); *H04W 72/1278* (2013.01); *H04W 74/0808* (2013.01); *H04W 72/1289* (2013.01); *H04W 74/006* (2013.01); *H04W 88/10* (2013.01)

(56) References Cited

U.S. PATENT DOCUMENTS

| | | | |
|---|---|---|---|
| 2010/0290406 | A1 | 11/2010 | Miki et al. |
| 2010/0323738 | A1 | 12/2010 | Aiba et al. |
| 2012/0044922 | A1 | 2/2012 | Ishii |
| 2013/0294356 | A1 | 11/2013 | Bala et al. |
| 2013/0301611 | A1* | 11/2013 | Baghel ............... H04W 12/001 370/331 |
| 2013/0343288 | A1 | 12/2013 | Ratasuk et al. |
| 2014/0335876 | A1 | 11/2014 | Ratasuk et al. |
| 2014/0341018 | A1 | 11/2014 | Bhushan et al. |
| 2014/0341135 | A1 | 11/2014 | Bhushan et al. |
| 2015/0049708 | A1 | 2/2015 | Damnjanovic et al. |
| 2015/0063111 | A1* | 3/2015 | Merlin ............... H04W 74/006 370/235 |
| 2015/0103715 | A1 | 4/2015 | Chen et al. |
| 2015/0156793 | A1* | 6/2015 | Dai ................... H04W 72/1236 370/329 |
| 2015/0208366 | A1* | 7/2015 | Papasakellariou .... H04W 52/34 370/311 |
| 2015/0312941 | A1 | 10/2015 | Oh et al. |
| 2015/0358968 | A1 | 12/2015 | Malladi et al. |
| 2016/0073344 | A1* | 3/2016 | Vutukuri ............. H04W 72/14 370/252 |
| 2017/0150382 | A1 | 5/2017 | Martin et al. |
| 2017/0164242 | A1 | 6/2017 | Zhang et al. |
| 2017/0311327 | A1 | 10/2017 | Tanaka |

FOREIGN PATENT DOCUMENTS

| | | |
|---|---|---|
| WO | 2013/087835 A1 | 6/2013 |
| WO | 2016/081375 A1 | 5/2016 |

OTHER PUBLICATIONS

Interdigital Communications, "On design targets and supported functionality for LTE LAA", Agenda Item: 7.3.2.2, 3GPP TSG-RAN WG1 Meeting #78bis, R1-144219, Ljubljana, Slovenia, Oct. 6-10, 2014.

Interdigital Communications, "On L1 design for LTE LAA DL only mode", Agenda Item: 6.3.2.2, 3GPP TSG-RAN WG1 Meeting #79, R1-145052, San Francisco, USA, Nov. 17-21, 2014.

International Search Report issued for corresponding International Patent Application No. PCT/JP2015/060770, dated Jun. 30, 2015, with an English translation.

Extended European search report with supplementary European search report and the European search opinion issued by the European Patent Office for corresponding European Patent Application No. 15888423.9, dated Feb. 26, 2018.

ZTE: "Analysis on potential issues and solutions for LAA UL transmission", Agenda Item: 2.2, 3GPP TSG RAN WG1 Ad-hoc Meeting, R1-151027, Paris, France, Mar. 24-26, 2015.

Fujitsu: "Design of LAA UL transmission", Agenda Item: 2.2, 3GPP TSG RAN WG1 Ad-hoc Meeting, R1-150987, Paris, France, Mar. 24-26, 2015.

ZTE: "Design on reservation signal for LAA", Agenda Item: 2.2, 3GPP TSG RAN WG1 Ad-hoc Meeting, R1-151025, Paris, France, Mar. 24-26, 2015.

Office Action issued by the Canadian Intellectual Property Office for corresponding Canadian Patent Application No. 2,980,984, dated Apr. 4, 2018.

3GPP TS 36.212 V8.6.0, "3rd Generation Partnership Project; Technical Specification Group Radio Access Network; Evolved Universal Terrestrial Radio Access (E-UTRA); Multiplexing and channel coding (Release 8)", Mar. 2009.

3GPP TS 36.213 V8.6.0, "3rd Generation Partnership Project; Technical Specification Group Radio Access Network; Evolved Universal Terrestrial Radio Access (E-UTRA); Physical layer procedures (Release 8)", Mar. 2009.

3GPP TS 36.321 V8.5.0, "3rd Generation Partnership Project; Technical Specification Group Radio Access Network; Evolved Universal Terrestrial Radio Access (E-UTRA) Medium Access Control (MAC) protocol specification (Release 8)", Mar. 2009.

3GPP TS 36.133 V8.5.0, "3rd Generation Partnership Project; Technical Specification Group Radio Access Network; Evolved Universal Terrestrial Radio Access (E-UTRA); Requirements for support of radio resource management (Release 8)", Mar. 2009.

Office Action issued by Rospatent Federal Service for Intellectual Property for corresponding Russian Patent Application No. 2017135272/08(061619), dated Aug. 24, 2018, with an English translation.

Notice of Preliminary Rejection issued by the Korean Intellectual Property Office for corresponding Korean Patent Application No. 10-2017-7027665, dated Sep. 27, 2018, with an English translation.

Non-Final Office Action issued by the United States Patent and Trademark Office for corresponding U.S. Appl. No. 15/644,640, electronically delivered on Jan. 14, 2019.

LG Electronics, "Candidate solutions for LAA operation", Agenda Item: 7.3.2.3, 3GPP TSG-RAN WG1 Meeting #78bis, R1-144042, Ljubljana, Slovenia, Oct. 6-10, 2014.

Extended European search report with supplementary European search report and the European search opinion issued by the European Patent Office for corresponding European Patent Application No. 15879938.7, dated Dec. 21, 2017.

Office Action and Examination Search Report issued by The Canadian Intellectual Property Office for corresponding International Patent Application No. 2,975,241, dated May 29, 2018.

Hitachi Ltd., "Design targets for LAA using LTE", Agenda Item: 7.3.2.2, 3GPP TSG RAN WG1 Meeting #78bis, R1-144221, Ljubljana, Slovenia, Oct. 6-10, 2014.

International Search Report with Written Opinion of the International Searching Authority issued for corresponding International Patent Application No. PCT/JP2015/052410, dated Apr. 7, 2015, with English translation.

Ratasuk et al., "License-exempt LTE deployment in heterogeneous network" IEEE copyright 2012.

Notice of Preliminary Rejection issued by the Korean Intellectual Property Office for corresponding Korean Patent Application No. 10-2017-7020946, dated Oct. 19, 2018, with an English translation.

Final Office Action issued by the USPTO for corresponding U.S. Appl. No. 15/644,640, dated Aug. 15, 2019.

Office Action issued by Intellectual Property India for corresponding Indian Patent Application No. 201737032724, dated Jan. 27, 2020, with an English translation.

Non-Final Office Action issued by the United States Patent and Trademark Office for corresponding U.S. Appl. No. 15/644,640, electronically delivered on Jan. 27, 2020.

First Office Action issued by the China National Intellectual Property Administration for corresponding Chinese Patent Application No. 201580074766.7, dated Apr. 1, 2020, with an English translation.

Wang et al., "Attached-RTS: Eliminating an Exposed Terminal Problem in Wireless Networks", IEEE Transactions on Parallel and Distributed Systems, vol. 24, No. 7, pp. 1289-1299, Jul. 2013.

Final Office Action issued by the United States Patent and Trademark Office for co-pending U.S. Appl. No. 15/644,640, electronically delivered on Apr. 22, 2020.

(56) References Cited

OTHER PUBLICATIONS

Non-Final Office Action issued by the United States Patent and Trademark Office for corresponding U.S. Appl. No. 15/703,606, electronically delivered on Jun. 1, 2018.
Final Office Action issued by the United States Patent and Trademark Office for corresponding U.S. Appl. No. 15/703,606, electronically delivered on Dec. 13, 2018.
Non-Final Office Action issued by the United States Patent and Trademark Office for corresponding U.S. Appl. No. 15/703,606, electronically delivered on May 3, 2019.
Final Office Action issued by the United States Patent and Trademark Office for corresponding U.S. Appl. No. 15/703,606, electronically delivered on Sep. 30, 2019.
Quayle Action issued by the United States Patent and Trademark Office for corresponding U.S. Appl. No. 15/703,606, electronically delivered on Jan. 9, 2020.
Notice of Allowance issued by the United States Patent and Trademark Office for corresponding U.S. Appl. No. 15/703,606, electronically delivered on Jan. 29, 2020.
First Notification of Office Action issued by the China National Intellectual Property Administration for corresponding Chinese Patent Application No. 201580078594.0, dated Jul. 3, 2020, with full English translation attached.
Second Notification of Office Action issued by the China National Intellectual Property Administration for the corresponding Chinese Patent Application No. 201580074766.7, dated Aug. 24, 2020, with an English translation.
Non-Final Office Action issued by the USPTO for corresponding U.S. Appl. No. 15/644,640 dated Sep. 17, 2020.

\* cited by examiner

BASE STATION, TERMINAL, AND WIRELESS COMMUNICATION SYSTEM

CROSS-REFERENCE TO RELATED APPLICATION

This application is a continuation of U.S. application Ser. No. 15/703,606, filed on Sep. 13, 2017, now pending, which is a continuation application of International Application PCT/JP2015/060770, filed on Apr. 6, 2015, and designating the U.S., the entire contents of each are incorporated herein by reference.

FIELD

The present invention relates to a base station, a terminal, and a wireless communication system.

BACKGROUND

In recent years, in order to achieve a higher speed and a larger capacity in wireless communications performed in wireless communication systems such as a mobile telephone system, some discussions about next-generation wireless communication technologies have been made. For example, a technology has been discussed about establishing a communication using a carrier in a frequency band that requires a license (licensed band carrier (LC)) and a carrier in a frequency band that does not require a license (unlicensed band carrier (UC)) in a communication standard referred to as long term evolution (LTE). This technology is referred to as licensed assisted access (LAA).

In the LAA, when a terminal performs an up Link (UL) transmission to a base station in an unlicensed band, the base station transmits a UL grant, which requests transmission of data, to the terminal via a licensed band. Further, for example, the base station performs listen before talk (LBT) in the unlicensed band before the terminal performs the UL transmission. Furthermore, for example, there have been discussions to cause the base station, upon detecting that the unlicensed band is idle, to transmit a reservation signal in the unlicensed band until a timing of the UL transmission performed by the terminal, in order to reserve the unlicensed band used by the terminal for the UL transmission. This allows the terminal to perform the UL transmission by using the unlicensed band a predetermined time after the UL grant. Prior art example is disclosed in 3GPP RAN1 Contribution document R1-150186.

Incidentally, in the technology disclosed in the above-referenced Non Patent Literature, if a busy state of the unlicensed band is continued and the terminal does not receive the reservation signal in the unlicensed band until the timing of the UL transmission, the terminal cancels the UL transmission, for example. Accordingly, the opportunity of transmitting data scheduled to be transmitted by the UL transmission is suspended until a predetermined period elapses after a next UL grant transmitted from the base station. Therefore, in some cases, a throughput of data transmission in an uplink from the terminal to the base station may be reduced.

SUMMARY

A base station disclosed, according to an aspect, performs wireless communication with a terminal by using a dedicated band dedicated to a wireless communication system including the base station and the terminal and a shared band shared with other systems. The base station includes a control signal transmitting unit, a determining unit, a permission signal transmitting unit. The control signal transmitting unit transmits, to the terminal, a control signal for specifying a resource in the shared band to be used for data transmission by the terminal. The determining unit determines whether the resource in the shared band is idle or busy. The permission signal transmitting unit transmits a permission signal for permitting transmission in the shared band when the determining unit determines that the resource in the shared band is idle. The control signal or the permission signal includes an offset indicating a time from the permission signal to a start of transmission of data from the terminal to the base station with reference to the permission signal transmitted from the permission signal transmitting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a base station, a terminal, a wireless communication system, a method of controlling the base station, and a method of controlling the terminal disclosed in the present application will be described in detail below based on the drawings. The disclosed technology is not limited by the embodiments described below. Furthermore, the embodiments may be combined as appropriate, so long as processing contents do not conflict with each other.

First Embodiment

[Wireless Communication System 10]

Figure 1:
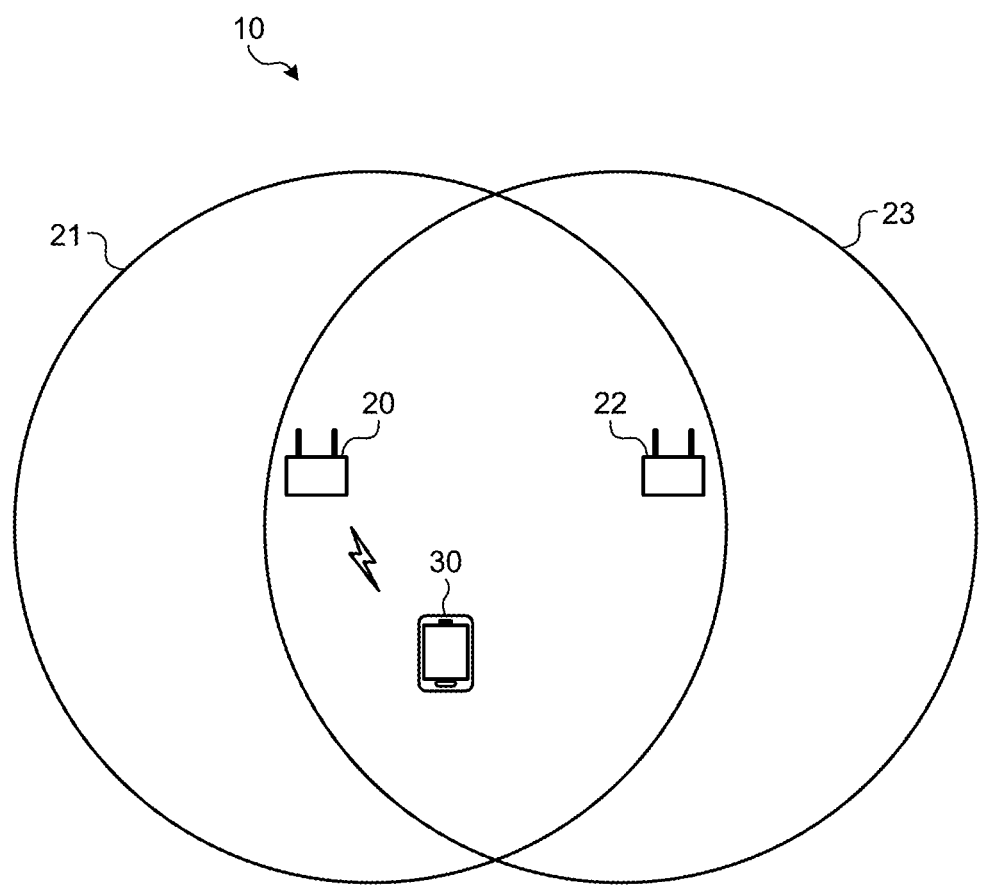
FIG. 1 is a schematic diagram illustrating an example of a wireless communication system.

FIG. 1 is a schematic diagram illustrating an example of a wireless communication system 10. The wireless communication system 10 includes a base station 20, a base station 22, and a terminal 30. The base station 20 performs wireless communication based on LTE, for example. The base station 20 is an evolved Node B (eNB) as defined in LTE, for example. The terminal 30 is a user equipment (UE) as defined in LTE, for example. The terminal 30 belongs to the same cell managed by the base station 20, and communicates with the base station 20 in the cell. In the following descriptions, the base station 20 and the terminal 30 may be described as an LTE system.

The base station 22 is, for example, a base station that belongs to a system different from the LTE system to which the base station 20 belongs. The base station 22 is, for example, a base station that belongs to an LTE system of a provider different from the LTE system to which the base station 20 belongs, or a base station that belongs to a different communication system such as a wireless LAN system.

The base station 20 performs wireless communication with the terminal 30 in the cell by using a first band dedicated to the LTE system to which the base station 20 belongs and a second band shared by the LTE system to which the base station 20 belongs and other communication systems. The first band is a licensed band carrier (LC) of 2 GHz band, for example. The second band is an unlicensed band carrier (UC) of 5 GHz band, for example. Hereinafter, the first band is referred to as a licensed band and the second band is referred to as an unlicensed band.

In the LTE system to which the base station 20 belongs, the first band is assigned to a primary component carrier (PCC), for example, and the second band is assigned to a secondary component carrier (SCC), for example. In the first embodiment, the first band is a band dedicated to the LTE system to which the base station 20 belongs, and the second band is a shared band shared by the LTE system to which the base station 20 belongs and the communication system to which the base station 22 belongs.

Furthermore, in FIG. 1, a reference sign 21 indicates an area in which radio waves transmitted from arbitrary devices reach the base station 20 at intensities that are determined as busy by carrier sense of the base station 20. Moreover, a reference sign 23 indicates an area in which radio waves transmitted from arbitrary devices reach the base station 22 at intensities that are determined as busy by carrier sense of the base station 22.

The base station 20, when requesting the terminal 30 to perform a UL transmission using the unlicensed band, transmits a UL grant including information on a resource used for the UL transmission to the terminal 30 in the licensed band. The base station 20 then performs LBT in the unlicensed band at a timing before the timing of the UL transmission performed by the terminal 30. When determining that the unlicensed band is idle, the base station 20 transmits a permission signal in the unlicensed band. In the first embodiment, the permission signal is a clear to send (CTS) signal, for example. By transmitting the permission signal, a band in the unlicensed band to be used by the terminal 30 for the UL transmission is reserved for the terminal 30. The terminal 30 that has received the UL grant, upon detecting the permission signal in the unlicensed band, performs the UL transmission by using the resource of the unlicensed band specified by the UL grant.

[Operation of Wireless Communication System 10]

Figure 2:
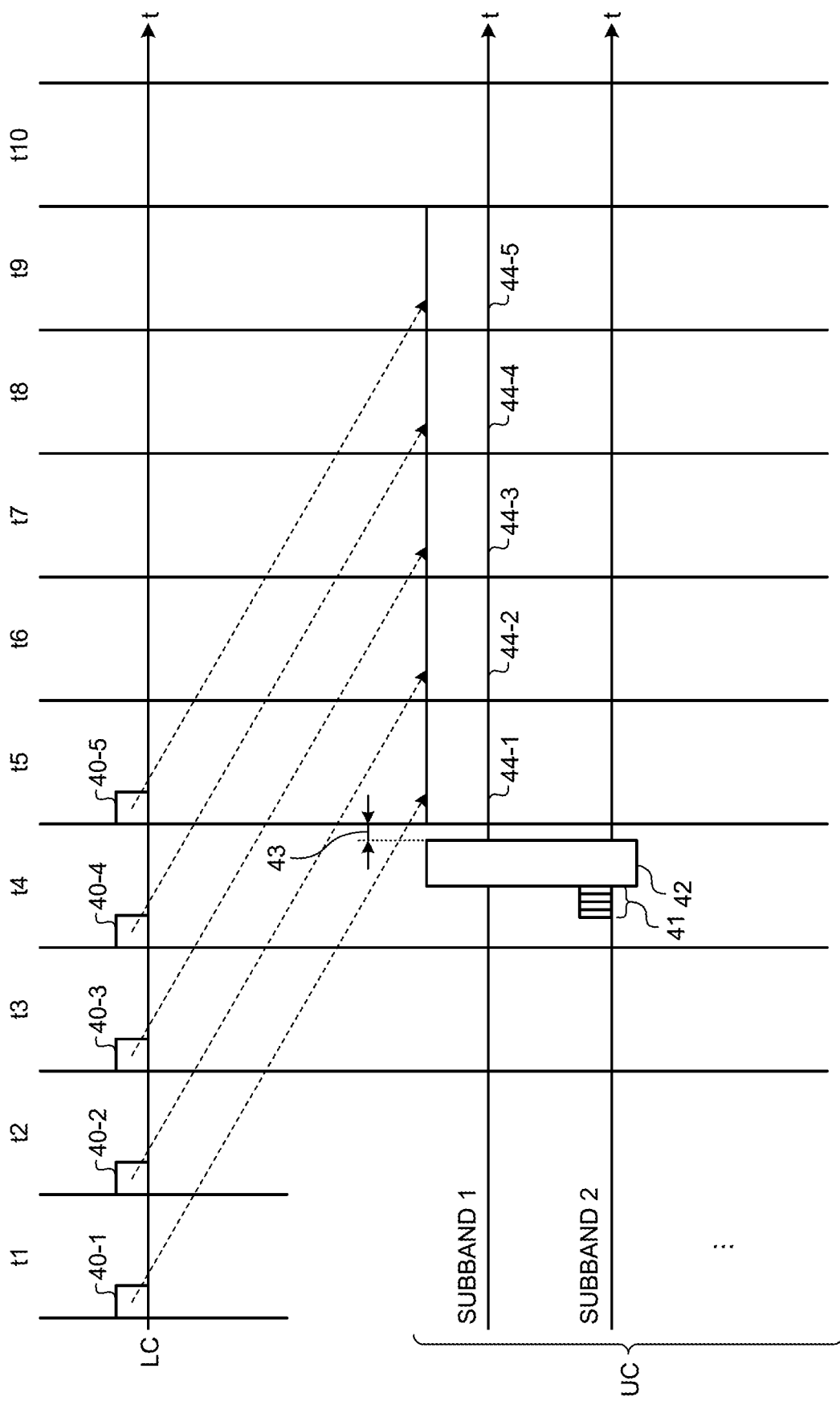
FIG. 2 is a schematic diagram illustrating an example of operation of the wireless communication system in the first embodiment.
Figure 3:
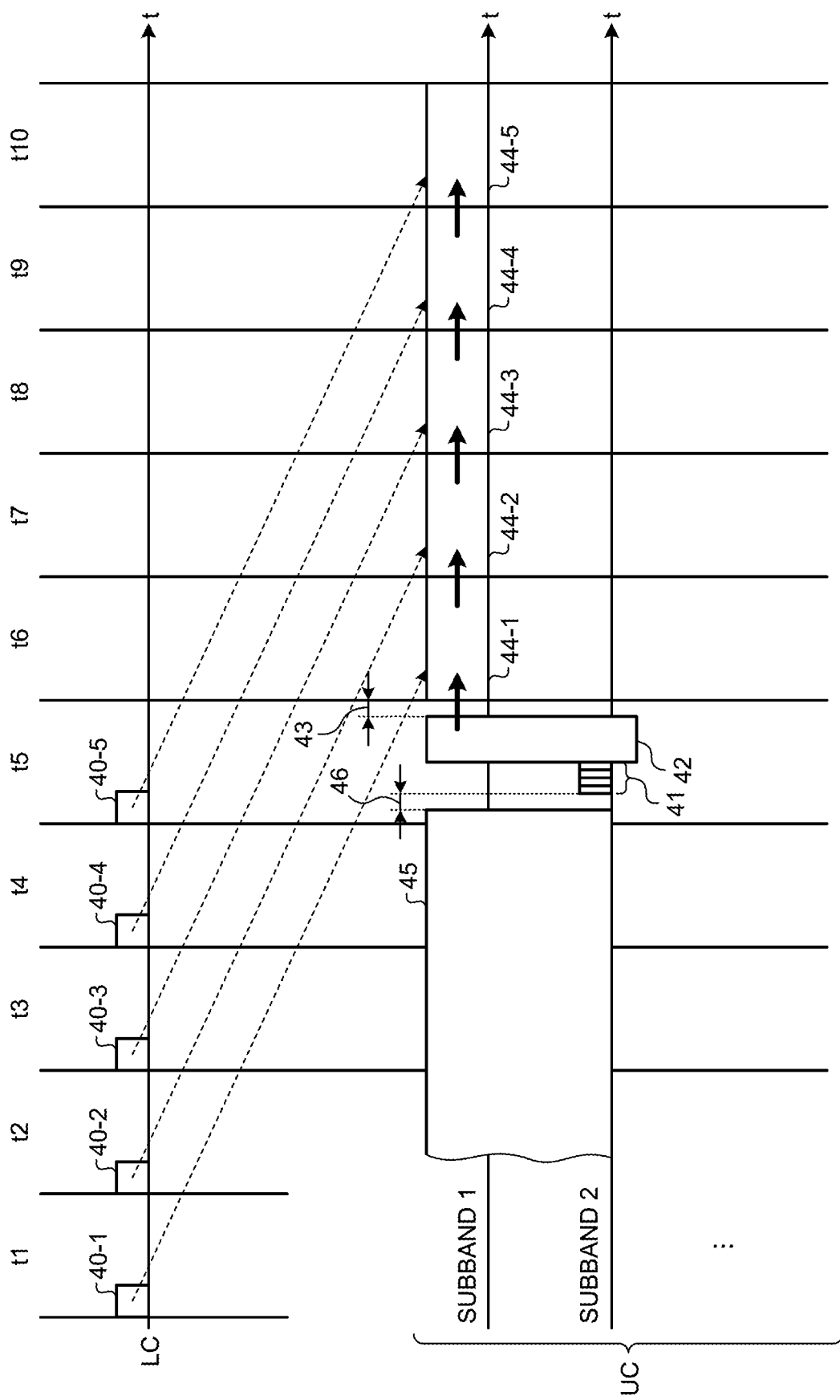
FIG. 3 is a schematic diagram illustrating an example of operation of the wireless communication system in the first embodiment.

Next, with reference to FIG. 2 and FIG. 3, an example of operation performed when the terminal 30 performs the UL transmission in the unlicensed band in response to an instruction from the base station 20 will be described. FIG. 2 and FIG. 3 are diagrams illustrating an example of the operation performed by the wireless communication system 10 in the first embodiment. FIG. 2 illustrates a case in which the unlicensed band is detected to be idle when the base station 20 performs LBT, and FIG. 3 illustrates a case in which the unlicensed band is detected to be busy when the base station 20 performs LBT.

In FIG. 2 and FIG. 3, upper parts indicate signals transmitted by using the LC, and lower parts indicate signals transmitted by using the UC. Furthermore, in FIG. 2 and FIG. 3, the horizontal axes indicate the flow of time, and t1 to t5 indicate periods in units of a subframe (for example, 1 millisecond). The unlicensed band is divided into a plurality of sub-bands as illustrated in FIG. 2 and FIG. 3 for example. In the first embodiment, the unlicensed band is 20 MHz for example, and is divided into four sub-bands by 5 MHz for example.

As illustrated in FIG. 2 for example, the base station 20 generates a UL grant 40 for requesting a UL transmission when a data transmission request to the terminal 30 is issued. The base station 20 then transmits the generated UL grant 40 to the terminal 30 in the licensed band. In the example illustrated in FIG. 2, for example, the base station 20 transmits UL grants 40-1 to 40-5 respectively to the five terminals 30 in the corresponding subframe periods t1 to t5.

The UL grant 40 includes identification information, information on a sub-band, an offset, and time limit information. The identification information included in the UL grant 40 has the same value as identification information included in the permission signal that is used as a reference when the terminal 30 performs the UL transmission. Furthermore, the identification information includes a cell ID for identifying the cell of the base station 20 that transmits the UL grant 40 and the permission signal. By including the cell ID in the identification information, even when a plurality of the base stations 20 transmit permission signals, the terminal 30 can identify a permission signal to be used as a reference for the UL transmission. The cell ID is an example of base station identification information.

The information on the sub-band included in the UL grant 40 indicates a sub-band that is a resource of the unlicensed band to be used when the terminal 30 performs the UL transmission. Furthermore, the offset included in the UL grant 40 indicates a time from the permission signal to a start of the UL transmission. In the first embodiment, the offset is specified in units of a subframe in LTE, for example. Moreover, the time limit information included in the UL grant 40 indicates a time limit for the terminal 30 to wait for the permission signal. In the first embodiment, the time limit information is specified in units of a subframe with reference to a subframe in which the UL grant 40 is transmitted, for example. In the first embodiment, the time limit specified by the time limit information is a timing ten subframes after the subframe in which the UL grant 40 is transmitted, for example.

The base station 20, when causing a plurality of the terminals 30 to perform the UL transmission in consecutive subframes, sets the identification information included in the respective UL grants 40 to the same value. Furthermore, the base station 20, when causing a plurality of the terminals 30 to perform the UL transmission in consecutive subframes, sequentially shifts the offsets included in the UL grants 40 to be transmitted to the respective terminals 30 by a predetermined time (for example, a time of one subframe).

In the example illustrated in FIG. 2, for example, the UL grant 40-1 includes, as the offset, a value of "1" indicating that the UL transmission is performed in the first subframe after the subframe in which the permission signal is transmitted. Similarly, for example, the UL grant 40-5 includes, as the offset, a value of "5" indicating that the UL transmission is performed in the fifth subframe after the subframe in which the permission signal is transmitted.

Subsequently, the base station 20 performs LBT in the unlicensed band a predetermined time after transmission of the UL grant 40 (for example, after three subframes). Then, upon detecting that the unlicensed band is idle and confirming that the idle state is continued during a backoff period 41, the base station 20 transmits permission signals 42 in all of the sub-bands in the unlicensed band. The permission signals 42 include identification information for identifying the respective permission signals 42. For example, the permission signals 42 are transmitted in the unlicensed band in a certain length such that a period 43 of a short inter-frame space (SIFS) after completion of the transmission of the permission signals 42 ends at a timing of border between the subframe in which the permission signals 42 are transmitted and a next subframe.

Upon receiving the UL grant 40 in the licensed band, the terminal 30 acquires the identification information, the information on the sub-band, the offset, and the time limit information from the UL grant 40. Furthermore, upon receiving the permission signal 42 in the unlicensed band, the terminal 30 acquires the identification information from the permission signal 42. Then, after a lapse of a time specified by the offset acquired from the UL grant 40 with reference to the timing at which the permission signal 42 is received, the terminal 30 performs a UL transmission of a signal 44 by using the sub-band of the unlicensed band specified by the UL grant 40.

In the example illustrated in FIG. 2, for example, the terminal 30 that has received the UL grant 40-1 including the offset with a value of "1" performs a UL transmission of a signal 44-1 in the subframe period t5 that is the first subframe after the subframe period t4 in which the permission signal 42 is transmitted. Similarly, the terminal 30 that has received the UL grant 40-5 including the offset with a value of "5" performs a UL transmission of a signal 44-5 in the subframe period t9 that is the fifth subframe after the subframe period t4 in which the permission signal 42 is transmitted.

Furthermore, as illustrated in FIG. 3 for example, when another signal 45 is transmitted in the unlicensed band in the period t4 after a lapse of a predetermined time since the transmission of the UL grant 40, the base station 20 detects that the unlicensed band is busy by LBT. The base station 20 then continues the LBT in the unlicensed band. Then, as illustrated in FIG. 3 for example, upon detecting that the unlicensed band is idle in the period t5, the base station 20 confirms whether the idle state is continued during a period 46 of a Distributed coordination function Inter Frame Space (DIFS). If it is confirmed that the idle state is continued during the period 46, the base station 20 confirms whether the idle state is continued during the backoff period 41, and after confirming that the idle state is continued, transmits the permission signal 42 in the unlicensed band.

After a lapse of a time specified by the offset acquired from the UL grant 40 with reference to the timing at which the permission signal 42 is received, each of the terminals 30 performs the UL transmission of the signal 44 by using the sub-band of the unlicensed band specified by the UL grant 40. Therefore, as indicated by arrows in FIG. 3 for example, all of the timings of the UL transmissions of the signals 44-1 to 44-5 by the respective terminals 30 are shifted backward due to the delay of the transmission of the permission signals 42.

Incidentally, when it is determined that the unlicensed band is busy at the timing of the LBT, and if the base station 20 stops transmission of the permission signal 42 and retransmits the UL grant 40, the UL transmission is suspended until a predetermined time elapses after a next UL grant 40. Consequently, a throughput of data transmission in the uplink is reduced.

In contrast, the base station 20 of the first embodiment continues the LBT even when it is determined that the unlicensed band is busy by the LBT, and transmits the permission signal 42 in the unlicensed band when it is detected that the unlicensed band is idle. Therefore, even when the UL grant 40 is not retransmitted, the terminal 30 can perform the UL transmission with reference to the timing at which the permission signal 42 is transmitted. Consequently, the wireless communication system 10 can improve the throughput of data in the uplink from the terminal 30 to the base station 20. Furthermore, it is possible to reduce retransmission of the UL grant, so that it is possible to reduce the traffic of a control signal in the licensed band.

Incidentally, when causing a plurality of the terminals 30 to perform the UL transmission in consecutive subframes, the base station 20 adjusts the offsets that specify the timings of the UL transmissions performed by the respective terminals 30 with reference to the single permission signal 42. Consequently, in some cases, the permission signal 42 may be transmitted before the UL grant 40 depending on the timing of transmission of the permission signal 42. Therefore, each of the terminals 30 waits to receive the permission signal 42 in the unlicensed band before receiving the UL grant 40 in the licensed band. Then, upon receiving both of the UL grant 40 and the permission signal 42, each of the terminals 30 performs the UL transmission at the timing specified by the offset in the UL grant 40 with reference to the timing at which the permission signal 42 is transmitted.

[Base Station 20]

Figure 4:
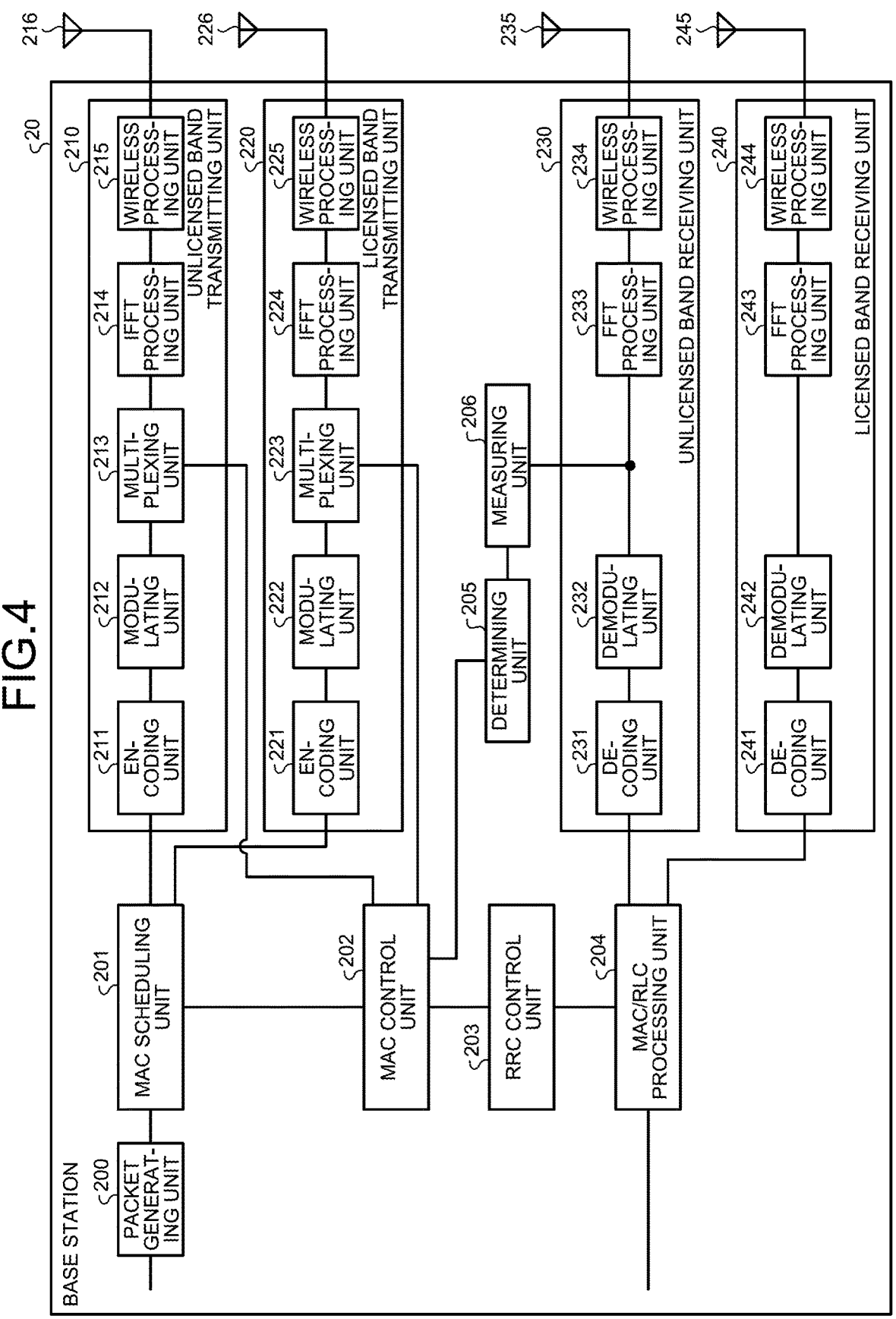
FIG. 4 is a block diagram illustrating an example of the base station.

FIG. 4 is a block diagram illustrating an example of the base station 20. The base station 20 includes a packet generating unit 200, a media access control (MAC) scheduling unit 201, a MAC control unit 202, and a radio resource control (RRC) control unit 203. Furthermore, the base station 20 includes a MAC/radio link control (RLC) processing unit 204, a determining unit 205, and a measuring unit 206. Moreover, the base station 20 includes an unlicensed band transmitting unit 210, a licensed band transmitting unit 220, an unlicensed band receiving unit 230, a licensed band receiving unit 240, an antenna 216, an antenna 226, an antenna 235, and an antenna 245. Incidentally, in the first embodiment, the antenna 216, the antenna 226, the antenna 235, and the antenna 245 are implemented by separate antennas; however, as another example, the antennas may be implemented by a single antenna.

The licensed band receiving unit 240 performs a process of decoding data from a signal received in the licensed band. The licensed band receiving unit 240 includes a decoding unit 241, a demodulating unit 242, an FFT processing unit 243, and a wireless processing unit 244.

The wireless processing unit 244 performs a wireless process on a signal received via the antenna 245. The wireless process performed by the wireless processing unit 244 includes, for example, a process of converting the frequency of the received signal from the frequency of the licensed band to the frequency of the baseband. The wireless processing unit 244 outputs the received signal subjected to the wireless process to the FFT processing unit 243.

The FFT processing unit 243 performs a fast Fourier transform (FFT) process on the received signal output from the wireless processing unit 244. Consequently, the received signal subjected to the frequency conversion from the licensed band to the baseband is converted from the time domain to the frequency domain. The FFT processing unit 243 outputs the received signal subjected to the FFT process to the demodulating unit 242.

The demodulating unit 242 demodulates the received signal output from the FFT processing unit 243. Then, the demodulating unit 242 outputs the received signal subjected to the demodulation to the decoding unit 241. The decoding unit 241 decodes the received signal output from the demodulating unit 242. Then, the decoding unit 241 outputs the decoded data to the MAC/RLC processing unit 204.

The unlicensed band receiving unit 230 performs a process of decoding data from a signal received in the unlicensed band. The unlicensed band receiving unit 230 includes a decoding unit 231, a demodulating unit 232, an FFT processing unit 233, and a wireless processing unit 234.

The wireless processing unit 234 performs a wireless process on a signal received via the antenna 235. The wireless process performed by the wireless processing unit 234 includes, for example, a process of converting the frequency of the received signal from the frequency of the unlicensed band to the frequency of the baseband. The wireless processing unit 234 outputs the received signal subjected to the wireless process to the FFT processing unit 233.

The FFT processing unit 233 performs an FFT process on the received signal output from the wireless processing unit 234. Consequently, the received signal subjected to the frequency conversion from the unlicensed band to the baseband is converted from the time domain to the frequency domain. The FFT processing unit 233 outputs the received signal subjected to the FFT process to the demodulating unit 232 and the measuring unit 206.

The demodulating unit 232 demodulates the received signal output from the FFT processing unit 233. Then, the demodulating unit 232 outputs the received signal subjected to the demodulation to the decoding unit 231. The decoding unit 231 decodes the received signal output from the demodulating unit 232. Then, the decoding unit 231 outputs the decoded data to the MAC/RLC processing unit 204.

The measuring unit 206 measures interference power in the unlicensed band on the basis of the received signal output from the FFT processing unit 233. Then, the measuring unit 206 outputs a measurement result of the interference power to the determining unit 205.

The determining unit 205 determines whether the unlicensed band is idle or busy on the basis of the measurement result output from the measuring unit 206. Then, the determining unit 205 outputs a determination result to the MAC control unit 202.

The MAC/RLC processing unit 204 performs a process in the MAC layer and a process in the RLC layer on the basis of the data output from the decoding unit 231 and the decoding unit 241. The MAC/RLC processing unit 204 outputs data obtained through the processes in the respective layers to, for example, a higher-level device of the base station 20. Furthermore, the MAC/RLC processing unit 204 outputs control information included in the data obtained through the processes in the respective layers to the RRC control unit 203.

The RRC control unit 203 performs radio resource control on the basis of the control information output from the MAC/RLC processing unit 204. The radio resource control performed by the RRC control unit 203 is a process in the RRC layer. The RRC control unit 203 generates control information on the basis of the radio resource control, and outputs the generated control information to the MAC control unit 202.

The MAC control unit 202 controls the MAC layer on the basis of the control information output from the RRC control unit 203 and the determination result output from the determining unit 205. Then, the MAC control unit 202 generates control information on the basis of the control on the MAC layer, and outputs the generated control information to the MAC scheduling unit 201.

Furthermore, when a data transmission request to the terminal 30 is issued, the MAC control unit 202 generates a UL grant for requesting a UL transmission. Then, the MAC control unit 202 outputs the generated UL grant to a multiplexing unit 223 to be described later.

Moreover, when the data transmission request to the terminal 30 is issued, the MAC control unit 202 performs LBT in the unlicensed band on the basis of the determination result output from the determining unit 205 before the timing of the UL transmission. Then, upon detecting that the unlicensed band is idle, the MAC control unit 202 generates a permission signal, and outputs the generated permission signal to a multiplexing unit 213.

The packet generating unit 200 generates a packet including user data output from a higher-level device. Then, the packet generating unit 200 outputs the generated packet to the MAC scheduling unit 201.

The MAC scheduling unit 201 performs scheduling in the MAC layer with respect to the packet output from the packet generating unit 200, on the basis of the control information output from the MAC control unit 202. Then, the MAC scheduling unit 201 controls output of the packet generated by the packet generating unit 200 to the unlicensed band transmitting unit 210 or to the licensed band transmitting unit 220, on the basis of a result of the scheduling.

The licensed band transmitting unit 220 performs a process of transmitting data in the licensed band. The licensed band transmitting unit 220 includes an encoding unit 221, a modulating unit 222, the multiplexing unit 223, an inverse fast Fourier transform (IFFT) processing unit 224, and a wireless processing unit 225.

The encoding unit 221 encodes data of the packet output from the MAC scheduling unit 201. Then, the encoding unit 221 outputs the encoded data of the packet to the modulating unit 222. The modulating unit 222 modulates the data output from the encoding unit 221. Then, the modulating unit 222 outputs a modulated signal to the multiplexing unit 223.

The multiplexing unit 223 multiplexes the control signal such as the UL grant output from the MAC control unit 202 and the signal output from the modulating unit 222. Then, the multiplexing unit 223 outputs the multiplexed transmission signal to the IFFT processing unit 224.

The IFFT processing unit 224 performs an IFFT process on the transmission signal output from the multiplexing unit 223. Consequently, the transmission signal output from the multiplexing unit 223 is converted from the frequency domain to the time domain. The IFFT processing unit 224 outputs the transmission signal subjected to the IFFT process to the wireless processing unit 225.

The wireless processing unit 225 performs a wireless process on the transmission signal output from the IFFT processing unit 224. The wireless process performed by the wireless processing unit 225 includes, for example, a process of converting the frequency of the transmission signal from the frequency of the baseband to the frequency of the licensed band. The wireless processing unit 225 transmits the transmission signal subjected to the wireless process from the antenna 226.

The unlicensed band transmitting unit 210 performs a process of transmitting data in the unlicensed band. The unlicensed band transmitting unit 210 includes an encoding unit 211, a modulating unit 212, the multiplexing unit 213, an IFFT processing unit 214, and a wireless processing unit 215.

The encoding unit 211 encodes the data of the packet output from the MAC scheduling unit 201. Then, the encoding unit 211 outputs the encoded data of the packet to the modulating unit 212. The modulating unit 212 modulates the data of the packet output from the encoding unit 211. Then, the modulating unit 212 outputs a modulated signal to the multiplexing unit 213.

The multiplexing unit 213 multiplexes the signal such as the permission signal output from the MAC control unit 202 and the signal output from the modulating unit 212. Then, the multiplexing unit 213 outputs the multiplexed transmission signal to the IFFT processing unit 214.

The IFFT processing unit 214 performs an IFFT process on the transmission signal output from the multiplexing unit 213. Consequently, the transmission signal output from the multiplexing unit 213 is converted from the frequency domain to the time domain. The IFFT processing unit 214 outputs the transmission signal subjected to the IFFT process to the wireless processing unit 215.

The wireless processing unit 215 performs a wireless process on the transmission signal output from the IFFT processing unit 214. The wireless process performed by the wireless processing unit 215 includes, for example, a process of converting the frequency of the transmission signal from the frequency of the baseband to the frequency of the unlicensed band. The wireless processing unit 215 transmits the transmission signal subjected to the wireless process from the antenna 216.

[Terminal 30]

Figure 5:
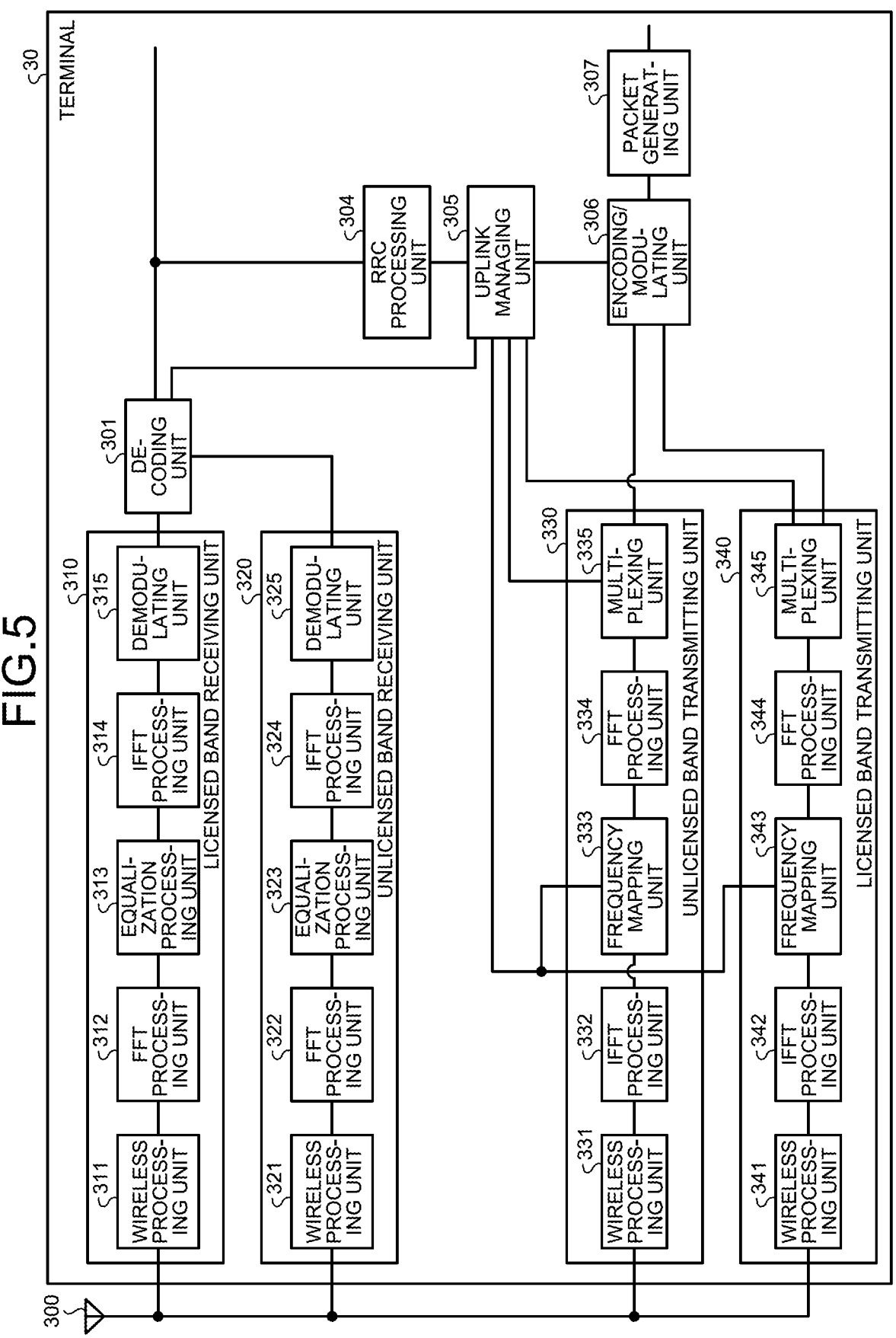
FIG. 5 is a block diagram illustrating an example of the terminal.

FIG. 5 is a block diagram illustrating an example of the terminal 30. The terminal 30 includes an antenna 300, a decoding unit 301, an RRC processing unit 304, an uplink managing unit 305, an encoding/modulating unit 306, and a packet generating unit 307. Furthermore, the terminal 30 includes a licensed band receiving unit 310, an unlicensed band receiving unit 320, an unlicensed band transmitting unit 330, and a licensed band transmitting unit 340.

Incidentally, in the first embodiment, the terminal 30 includes the single antenna 300. However, as another example, the antenna 300 may separately be provided in each of the licensed band receiving unit 310, the unlicensed band receiving unit 320, the unlicensed band transmitting unit 330, and the licensed band transmitting unit 340.

The licensed band receiving unit 310 performs a process of demodulating data from a signal received in the licensed band. The licensed band receiving unit 310 includes a wireless processing unit 311, an FFT processing unit 312, an equalization processing unit 313, an IFFT processing unit 314, and a demodulating unit 315.

The wireless processing unit 311 performs a wireless process on a signal received via the antenna 300. The wireless process performed by the wireless processing unit 311 includes, for example, a process of converting the frequency of the received signal from the frequency of the licensed band to the frequency of the baseband. The wireless processing unit 311 outputs the received signal subjected to the wireless process to the FFT processing unit 312.

The FFT processing unit 312 performs an FFT process on the received signal output from the wireless processing unit 311. Consequently, the received signal output from the wireless processing unit 311 is converted from the time domain to the frequency domain. The FFT processing unit 312 outputs the received signal subjected to the FFT process to the equalization processing unit 313. The equalization processing unit 313 performs an equalization process on the signal output from the FFT processing unit 312. Then, the equalization processing unit 313 outputs the received signal subjected to the equalization process to the IFFT processing unit 314.

The IFFT processing unit 314 performs an IFFT process on the received signal output from the equalization processing unit 313. Consequently, the received signal output from the equalization processing unit 313 is converted from the frequency domain to the time domain. The IFFT processing unit 314 outputs the received signal subjected to the IFFT process to the demodulating unit 315.

The demodulating unit 315 demodulates the received signal output from the IFFT processing unit 314. Then, the demodulating unit 315 outputs the received signal subjected to the demodulation to the decoding unit 301. Data decoded from the received signal demodulated by the licensed band receiving unit 310 includes a control signal such as the UL grant.

The unlicensed band receiving unit 320 performs a process of demodulating data from a signal received in the unlicensed band. The unlicensed band receiving unit 320 includes a wireless processing unit 321, an FFT processing unit 322, an equalization processing unit 323, an IFFT processing unit 324, and a demodulating unit 325.

The wireless processing unit 321 performs a wireless process on a signal received via the antenna 300. The wireless process performed by the wireless processing unit 321 includes, for example, a process of converting the frequency of the received signal from the frequency of the unlicensed band to the frequency of the baseband. The wireless processing unit 321 outputs the received signal subjected to the wireless process to the FFT processing unit 322.

The FFT processing unit 322 performs an FFT process on the received signal output from the wireless processing unit 321. Consequently, the received signal output from the wireless processing unit 321 is converted from the time domain to the frequency domain. Then, the FFT processing unit 322 outputs the received signal subjected to the FFT process to the equalization processing unit 323. The equalization processing unit 323 performs an equalization process on the received signal output from the FFT processing unit 322. Then, the equalization processing unit 323 outputs the received signal subjected to the equalization process to the IFFT processing unit 324.

The IFFT processing unit 324 performs an IFFT process on the received signal output from the equalization processing unit 323. Consequently, the received signal output from the equalization processing unit 323 is converted from the frequency domain to the time domain. The IFFT processing unit 324 outputs the received signal subjected to the IFFT process to the demodulating unit 325.

The demodulating unit 325 demodulates the received signal output from the IFFT processing unit 324. Then, the demodulating unit 325 outputs the received signal subjected to the demodulation to the decoding unit 301. Data decoded from the received signal demodulated by the unlicensed band receiving unit 320 includes a control signal such as the permission signal.

The decoding unit 301 decodes user data and a control signal from the received signal output from the licensed band receiving unit 310 and the unlicensed band receiving unit 320. Then, the decoding unit 301 outputs the decoded user data to, for example, an application processing unit (not illustrated) that performs a process based on the received data. Furthermore, the decoding unit 301 outputs the decoded control signal to the RRC processing unit 304 and the uplink managing unit 305. The control signal output to the uplink managing unit 305 includes the UL grant and the permission signal.

The RRC processing unit 304 performs radio resource control on the basis of the control signal output from the decoding unit 301. The radio resource control performed by the RRC processing unit 304 is a process in the RRC layer. The RRC processing unit 304 generates control information on the basis of the radio resource control, and outputs the generated control information to the uplink managing unit 305.

The uplink managing unit 305 controls the UL transmission on the basis of the control information output from the RRC processing unit 304 and the control signal output from the decoding unit 301. For example, when the decoding unit 301 outputs a UL grant, the uplink managing unit 305 acquires the identification information, the information on the sub-band in the unlicensed band, the offset, and the time limit information from the UL grant. Furthermore, when the decoding unit 301 outputs a permission signal, the uplink managing unit 305 acquires the identification information included in the permission signal.

Moreover, when a permission signal including the same identification information as the identification information acquired from the UL grant is detected in the unlicensed band, the uplink managing unit 305 determines whether a time corresponding to the offset included in the UL grant has elapsed since the detection of the permission signal. If the time corresponding to the offset has elapsed since the detection of the permission signal, the uplink managing unit 305 outputs a control signal such as a DMRS to a multiplexing unit 335 and a multiplexing unit 345.

Furthermore, the uplink managing unit 305 outputs information on assignment of a resource used for the UL transmission to a frequency mapping unit 333 and a frequency mapping unit 343 to be described later. Moreover, if the time corresponding to the offset has elapsed since detection of the permission signal, the uplink managing unit 305 instructs the encoding/modulating unit 306 (to be described later) to perform the UL transmission.

The packet generating unit 307 generates, for example, a packet including user data output from the application processing unit (not illustrated). Then, the packet generating unit 307 outputs the generated packet to the encoding/modulating unit 306. The encoding/modulating unit 306 performs an encoding/modulating process on the packet output from the packet generating unit 307. Then, the encoding/modulating unit 306 outputs a transmission signal subjected to the encoding/modulating process to the unlicensed band transmitting unit 330 or the licensed band transmitting unit 340 in accordance with an instruction from the uplink managing unit 305.

The licensed band transmitting unit 340 performs a process of transmitting data in the licensed band. The licensed band transmitting unit 340 includes a wireless processing unit 341, an IFFT processing unit 342, the frequency mapping unit 343, an FFT processing unit 344, and the multiplexing unit 345.

The multiplexing unit 345 multiplexes the control signal output from the uplink managing unit 305 and the transmission signal output from the encoding/modulating unit 306. Then, the multiplexing unit 345 outputs the multiplexed transmission signal to the FFT processing unit 344. The FFT processing unit 344 performs the FFT process on the transmission signal output from the multiplexing unit 345. Consequently, the transmission signal output from the multiplexing unit 345 is converted from the time domain to the frequency domain. The FFT processing unit 344 outputs the transmission signal subjected to the FFT process to the frequency mapping unit 343.

The frequency mapping unit 343 performs frequency mapping on the transmission signal output from the FFT processing unit 344, on the basis of the information on assignment of a resource used for the UL transmission, which is output from the uplink managing unit 305. Then, the frequency mapping unit 343 outputs the transmission signal subjected to the frequency mapping to the IFFT processing unit 342.

The IFFT processing unit 342 performs an IFFT process on the transmission signal output from the frequency mapping unit 343. Consequently, the transmission signal output from the frequency mapping unit 343 is converted from the frequency domain to the time domain. The IFFT processing unit 342 outputs the transmission signal subjected to the IFFT process to the wireless processing unit 341.

The wireless processing unit 341 performs a wireless process on the transmission signal output from the IFFT processing unit 342. The wireless process performed by the wireless processing unit 341 includes, for example, a process of converting the frequency of the transmission signal from the frequency of the baseband to the frequency of the licensed band. The wireless processing unit 341 transmits the transmission signal subjected to the wireless process via the antenna 300.

The unlicensed band transmitting unit 330 performs a process of transmitting data in the unlicensed band. The unlicensed band transmitting unit 330 includes a wireless processing unit 331, an IFFT processing unit 332, the frequency mapping unit 333, an FFT processing unit 334, and the multiplexing unit 335.

The multiplexing unit 335 multiplexes the control signal output from the uplink managing unit 305 and the signal output from the encoding/modulating unit 306. Then, the multiplexing unit 335 outputs the multiplexed transmission signal to the FFT processing unit 334. The FFT processing unit 334 performs the FFT process on the transmission signal output from the multiplexing unit 335. Consequently, the transmission signal output from the multiplexing unit 335 is converted from the time domain to the frequency domain. The FFT processing unit 334 outputs the transmission signal subjected to the FFT process to the frequency mapping unit 333.

The frequency mapping unit 333 performs frequency mapping on the transmission signal output from the FFT processing unit 334, on the basis of the information on assignment of a resource used for the UL transmission, which is output from the uplink managing unit 305. Then, the frequency mapping unit 333 outputs the transmission signal subjected to the frequency mapping to the IFFT processing unit 332.

The IFFT processing unit 332 performs an IFFT process on the transmission signal output from the frequency mapping unit 333. Consequently, the transmission signal output from the frequency mapping unit 333 is converted from the frequency domain to the time domain. The IFFT processing unit 332 outputs the transmission signal subjected to the IFFT process to the wireless processing unit 331.

The wireless processing unit 331 performs a wireless process on the transmission signal output from the IFFT processing unit 332. The wireless process performed by the wireless processing unit 331 includes, for example, a process of converting the frequency of the transmission signal from the frequency of the baseband to the frequency of the unlicensed band. The wireless processing unit 331 outputs the transmission signal subjected to the wireless process via the antenna 300.

[Operation of Base Station 20]

Figure 6:
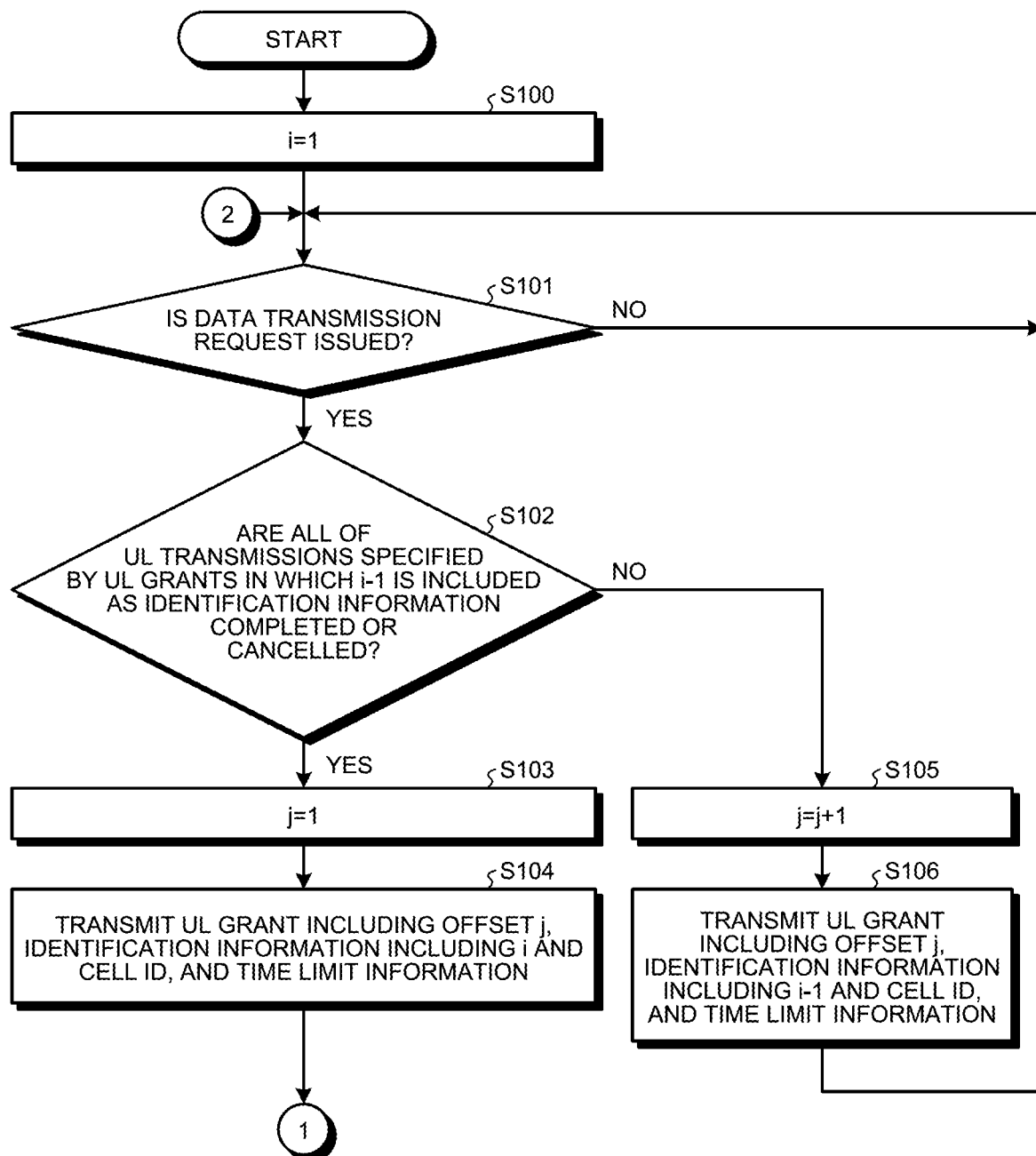
FIG. 6 is a flowchart illustrating an example of operation of the base station.
Figure 7:
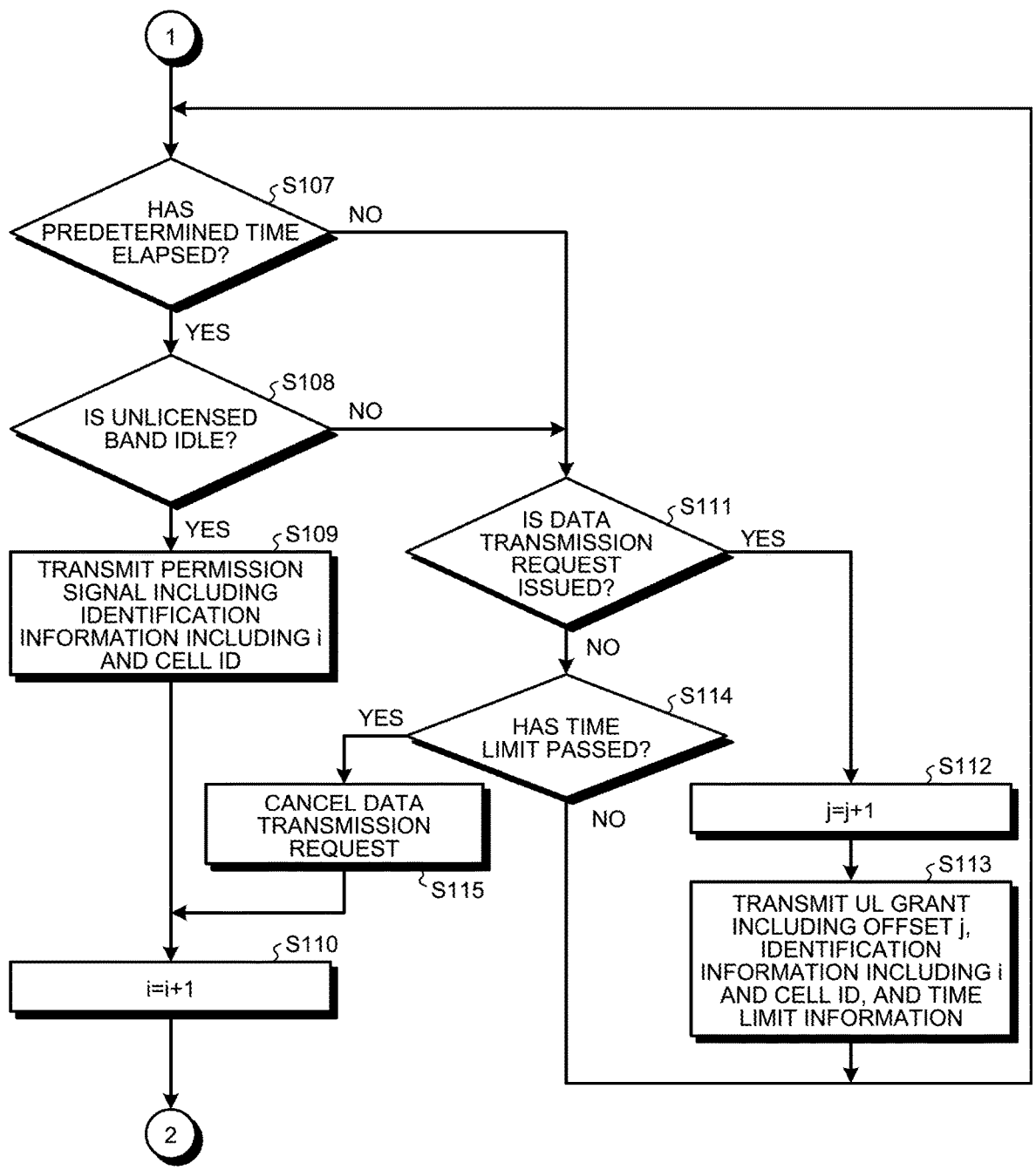
FIG. 7 is a flowchart illustrating an example of operation of the base station.

Next, operation of the base station 20 will be described. FIG. 6 and FIG. 7 are flowcharts illustrating an example of the operation performed by the base station 20.

First, the MAC control unit 202 of the base station 20 initializes a variable i to 1 (S100). Then, the MAC control unit 202 determines whether a data transmission request to the terminal 30 is issued (S101). If the data transmission request to the terminal 30 is issued (Yes at S101), the MAC control unit 202 determines whether all of UL transmissions specified by UL grants that include i−1 as the identification information are completed or cancelled (S102).

If there is a UL transmission that is not completed or cancelled among the UL transmissions specified by the UL grants that include i−1 as the identification information (No at S102), the MAC control unit 202 increments a variable j by 1 (S105). Then, the MAC control unit 202 generates a UL grant including an offset j indicating that the value of the offset is j, identification information including i−1 and a cell ID, and time limit information. Then, the MAC control unit 202 instructs the licensed band transmitting unit 220 to transmit the generated UL grant to the terminal 30 in the licensed band (S106). Then, the MAC control unit 202 performs the process at Step S101 again.

If all of the UL transmissions specified by the UL grants that include i−1 as the identification information are completed or cancelled (Yes at S102), the MAC control unit 202 initializes the variable j to 1 (S103). Then, the MAC control unit 202 generates a UL grant including the offset j, identification information including i and the cell ID, and the time limit information. Then, the MAC control unit 202 instructs the licensed band transmitting unit 220 to transmit the generated UL grant to the terminal 30 in the licensed band (S104).

Subsequently, the MAC control unit 202 determines whether a predetermined time (for example, a time corresponding to three subframes) has elapsed since the transmission of the UL grant (S107 in FIG. 7). If the predetermined time has elapsed since the transmission of the UL grant (Yes at S107), the MAC control unit 202 performs LBT in the unlicensed band and determines whether the unlicensed band is idle (S108).

If the unlicensed band is idle (Yes at S108), the MAC control unit 202 generates a permission signal that includes identification information including i and the cell ID. Then, the MAC control unit 202 instructs the unlicensed band transmitting unit 210 to transmit the generated permission signal to the unlicensed band (S109). Then, the MAC control unit 202 increments the variable i by 1 (S110), and performs the process at Step S101 illustrated in FIG. 6 again.

If the predetermined time has not elapsed since the transmission of the UL grant (No at S107), or if the unlicensed band is busy (No at S108), the MAC control unit 202 determines whether a data transmission request to the terminal 30 is issued (S111. If the data transmission request to the terminal 30 is issued (Yes at S111), the MAC control unit 202 increments the variable j by 1 (S112). Then, the MAC control unit 202 generates a UL grant including the offset j, identification information including i and the cell ID, and the time limit information. Then, the MAC control unit 202 instructs the licensed band transmitting unit 220 to transmit the generated UL grant to the terminal 30 in the licensed band (S113). Then, the MAC control unit 202 performs the process at Step S107 again.

Furthermore, if the data transmission request to the terminal 30 is not issued (No at S111), the MAC control unit 202 identifies a UL grant corresponding to a UL transmission that has not been performed. Then, the MAC control unit 202 determines whether a time limit indicated by the time limit information has passed since the transmission of the identified UL grant (S114). If the time limit has not passed (No at S114), the MAC control unit 202 performs the process at Step S107 again.

If the time limit indicated by the time limit information has passed since the transmission of the UL grant (Yes at S114), the MAC control unit 202 cancels the data transmission request that is provided to the terminal 30 by the UL grant (S115), and performs the process at Step S110.

Incidentally, if there is a UL transmission that is not completed or cancelled among the UL transmissions specified by the transmitted UL grants as described above (No at S102), the base station 20 transmits a UL grant that includes i−1 as the identification information (S106). Therefore, the base station 20 can cause the terminal 30 to use the already-transmitted permission signal including the identification information of i−1 at Step S109. Consequently, the base station 20 can cause the terminals 30 to perform the increased number of UL transmissions with the decreased number of the permission signals.

[Operation of Terminal 30]

Figure 8:
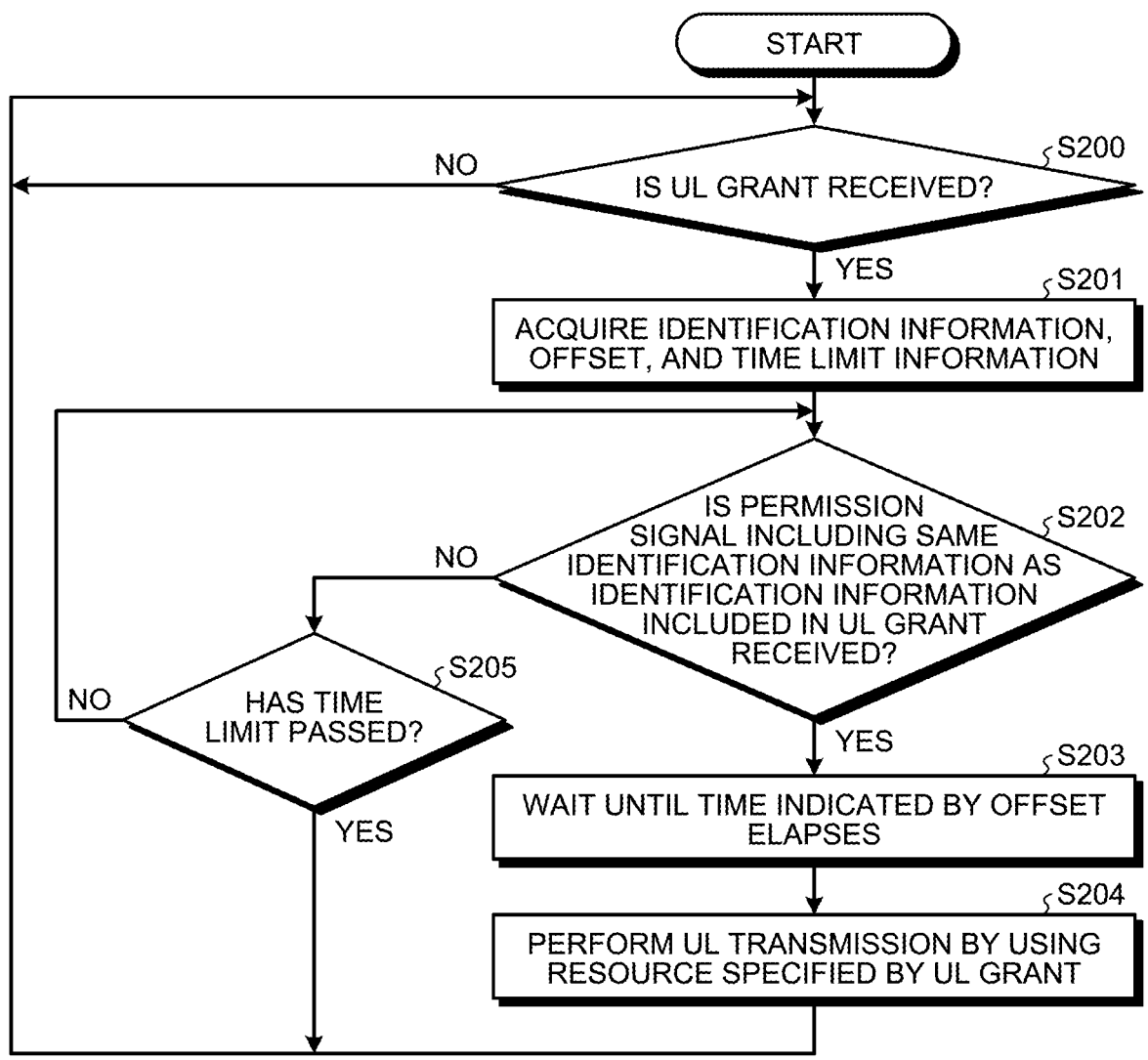
FIG. 8 is a flowchart illustrating an example of operation of the terminal.

Next, operation of the terminal 30 will be described. FIG. 8 is a flowchart illustrating an example of the operation performed by the terminal 30.

First, the uplink managing unit 305 determines whether a UL grant is received in the licensed band (S200). If the UL grant is received (Yes at S200), the uplink managing unit 305 acquires the identification information, the offset, and the time limit information from the UL grant (S201).

Subsequently, the uplink managing unit 305 determines whether a permission signal including the same identification information as the identification information included in the UL grant is received (S202). Incidentally, the permission signal may be received before the UL grant. If the permission signal including the same identification information as the identification information included in the UL grant is received (Yes at S202), the uplink managing unit 305 waits until a time indicated by the offset acquired from the UL grant elapses after the timing at which the permission signal is received (S203).

Subsequently, the uplink managing unit 305 provides the information on assignment of a resource specified by the UL grant to the unlicensed band transmitting unit 330. Then, the uplink managing unit 305 instructs the encoding/modulating unit 306 to perform a UL transmission, to thereby perform the UL transmission by using the resource specified by the UL grant (S204). Then, the uplink managing unit 305 performs the process at Step S200 again.

Furthermore, if the permission signal including the same identification information as the identification information included in the UL grant is not received (No at S202), the uplink managing unit 305 determines whether a time limit indicated by the time limit information acquired from the UL grant has passed (S205). If the time limit has not passed (No at S205), the uplink managing unit 305 performs the process at Step S202 again. In contrast, if the time limit has passed (Yes at S205), the uplink managing unit 305 cancels the UL transmission specified by the UL grant and performs the process at Step S200 again. By cancelling the UL transmission for which the time limit has passed, it is possible to prevent an increase in the power consumption of the terminal 30 due to the continued wait for the permission signal.

The first embodiment has been described above. As is clear from the above, according to the wireless communication system 10 of the first embodiment, it is possible to suppress a reduction in the throughput in the uplink.

Second Embodiment

In the above-described first embodiment, the base station 20 transmits the UL grant 40 to the terminal 30 in the licensed band. In contrast, in a second embodiment, the base station 20 transmits the UL grant 40 to the terminal 30 in the unlicensed band. However, in the unlicensed band, each communication apparatus performs transmission after detecting that a band is vacant. Therefore, in the second embodiment, when a data transmission request to the terminal 30 is issued, the base station 20 performs LBT in the unlicensed band, detects that the band is vacant, and thereafter transmits the UL grant 40 to the terminal 30.

Third Embodiment

In the above-described first embodiment, when it is detected that the unlicensed band is busy as a result of LBT performed before transmission of a permission signal, the base station 20 suspends the transmission of the permission signal until it is detected that the unlicensed band is idle. However, in the unlicensed band, in some cases, data transmission in a downlink (DL) from the base station 20 to the terminal 30 may be performed. When the data transmission in the DL is being performed in the unlicensed band, the unlicensed band is busy; however, the base station 20 can generate a signal to be transmitted from the base station 20 to the terminal 30. Therefore, in the third embodiment, if data transmission from the base station 20 to the terminal 30 is performed at the timing of the transmission of the permission signal, the permission signal is multiplexed and transmitted in the same subframe. Consequently, even when the data transmission in the DL is being performed in the unlicensed band, the base station 20 can provide the permission signal to the terminal 30.

Incidentally, when the data transmission in the DL is being performed in the unlicensed band, the base station 20 includes the permission signal in one of control channels that are multiplexed in the same frame as the data transmission to the terminal 30. Examples of the control channel include, for example, a physical downlink control channel (PDCCH) and an enhanced PDCCH (ePDCCH). Furthermore, to enable all of the controlled terminals 30 to receive a PDCCH or an ePDCCH indicating the permission signal, the base station 20 provides the permission signal in a common search space.

[Operation of Wireless Communication System 10]

Figure 9:
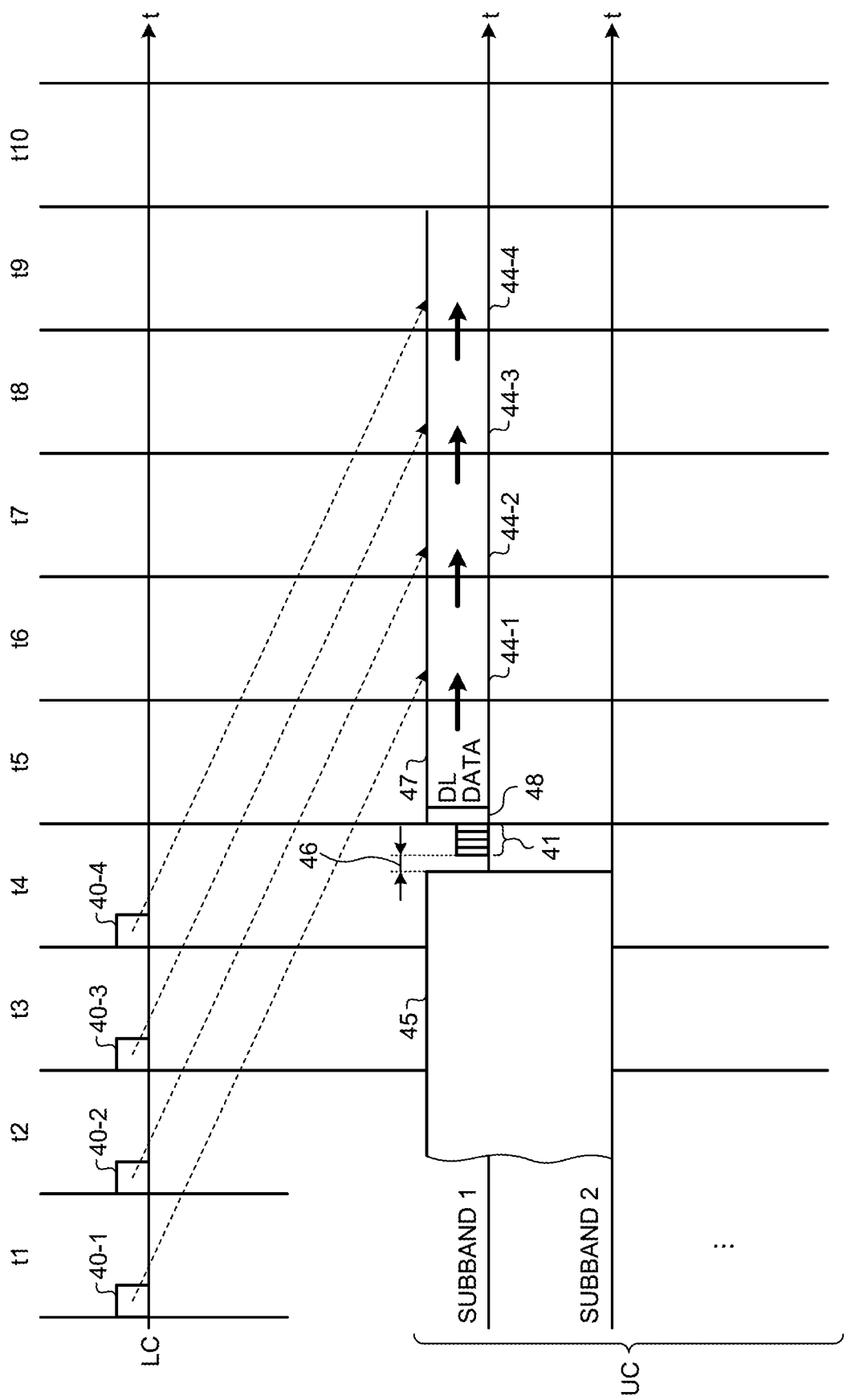
FIG. 9 is a schematic diagram illustrating an example of operation of a wireless communication system in a third embodiment.

FIG. 9 is a schematic diagram illustrating an example of operation performed by the wireless communication system 10 in the third embodiment. As illustrated in FIG. 9 for example, when the other signal 45 is transmitted in the unlicensed band in the subframe period t4 after a lapse of a predetermined time since transmission of the UL grant 40-1, the base station 20 detects that the unlicensed band is busy by LBT. Then, the base station 20 suspends transmission of the permission signal.

Meanwhile, the base station 20 performs LBT for the unlicensed band in order to transmit DL data to any of the controlled terminals 30 in the subframe period t5. Then, as illustrated in FIG. 9 for example, upon detecting that the unlicensed band is idle in the period t4, the base station 20 confirms whether the idle state is continued during the period 46 of the DIFS. If it is confirmed that the idle state is continued during the period 46, the base station 20 confirms that the idle state is continued during the random backoff period 41, and thereafter transmits DL data 47 in the unlicensed band in the subframe period t5.

At this time, the base station 20 includes the permission single in one of control channels 48 that are multiplexed with the DL data 47 transmitted in the subframe period t5, and transmits the permission signal in the unlicensed band. For example, a PDCCH that is the control channel 48 is transmitted in the predetermined number of symbols from the top of the subframe (for example, three symbols from the top at a maximum).

Each of the terminals 30 that has received the control channel 48 in the unlicensed band detects the permission signal from the control channel 48. Then, each of the terminals 30 transmits one of the signals 44-1 to 44-4 in the sub-band of the unlicensed band specified by the UL grant 40 after a lapse of a time specified by the offset acquired from the UL grant 40 with reference to the subframe in which the permission signal is detected. Therefore, the base station 20 can transmit the permission signal in the subframe in which the DL data is transmitted, without waiting for the transmission of the permission signal until the transmission of the DL data is completed. Accordingly, each of the terminals 30 can start the UL transmission after completion of the transmission of the DL data; therefore, it is possible to improve the throughput of data transmission in the uplink.

Incidentally, a control signal such as a DL assignment indicating assignment of a resource of the DL data is transmitted by using one of the control channels multiplexed with the DL data in the unlicensed band, for example. Furthermore, for another example, a control signal such as the DL assignment may be transmitted to each of the terminals 30 by using a control channel transmitted in the same subframe as the DL data in the licensed band, for example.

Fourth Embodiment

In the above-described third embodiment, the base station 20 includes the permission signal in the control channel multiplexed in the same subframe as the DL data when the DL data is transmitted in the unlicensed band at the timing of transmitting the permission signal. In contrast, the base station 20 of a fourth embodiment transmits the permission signal in the licensed band in a subframe including the timing of transmitting the permission signal when the DL data is transmitted in the unlicensed band at the timing of transmitting the permission signal. In the fourth embodiment, for example, the permission signal is transmitted by using one of control channels transmitted in the licensed band. The control channel is, for example, a PDCCH, an ePDCCH, or the like.

[Operation of Wireless Communication System 10]

Figure 10:
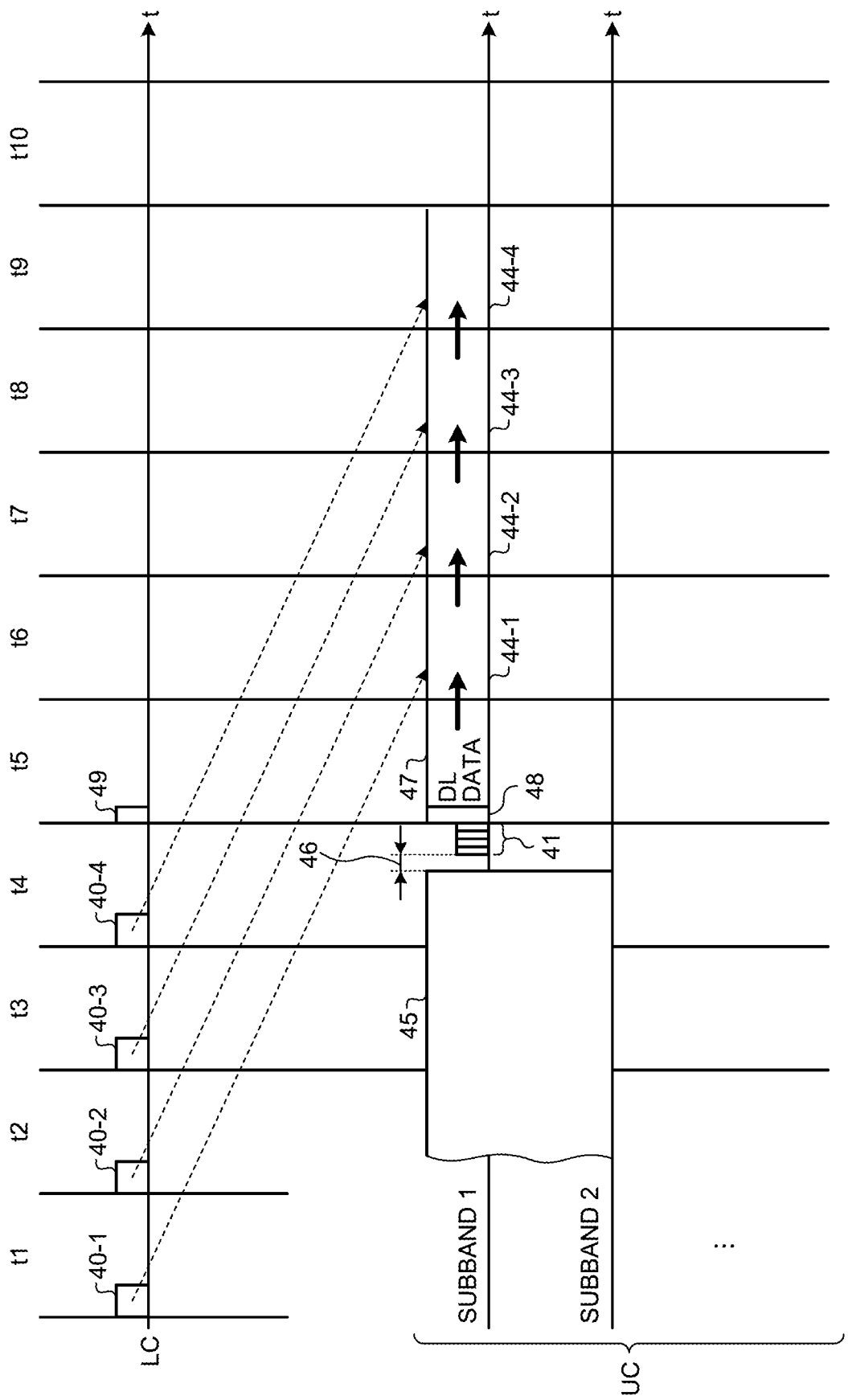
FIG. 10 is a schematic diagram illustrating an example of operation of a wireless communication system in a fourth embodiment.

FIG. 10 is a schematic diagram illustrating an example of operation performed by the wireless communication system 10 in the fourth embodiment. In FIG. 10, components denoted by the same reference signs as those in FIG. 9 are the same as the components described with reference to FIG. 3, excluding those described below; therefore, the detailed explanation will be omitted.

The base station 20, upon detecting that the unlicensed band is idle by performing LBT in the subframe period t4, transmits DL data in the unlicensed band in the subframe period t5. The DL data 47 is multiplexed with a plurality of the control channels 48 that include control signals such as the DL assignment. Furthermore, the base station 20 transmits the permission signal to each of the terminals 30 by using one of control channels 49 that are transmitted in the licensed band in the subframe period t5 in which the DL data is transmitted.

Each of the terminals 30 that has received the control channel 49 in the licensed band detects the permission signal from the control channel 49. Then, each of the terminals 30 transmits one of the signals 44-1 to 44-4 in the sub-band of the unlicensed band specified by the UL grant 40 after a lapse of a time specified by the offset acquired from the UL grant 40 with reference to the subframe in which the permission signal is detected. Even in the fourth embodiment, the base station 20 can transmit the permission signal in the subframe in which the DL data is transmitted, without waiting for the transmission of the permission signal until the transmission of the DL data is completed. Therefore, it is possible to improve the throughput of data transmission in the uplink.

[Hardware]

Figure 11:
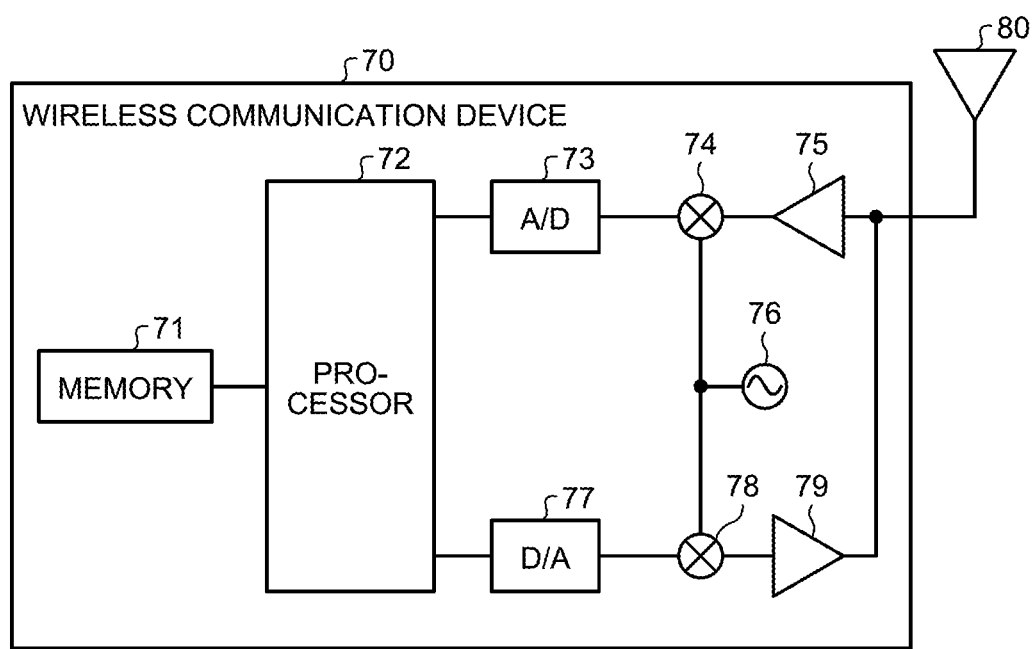
FIG. 11 is a schematic diagram illustrating an example of a wireless communication device that implements functions of the base station or the terminal.

The base station 20 and the terminal 30 in the above-described embodiments are implemented by, for example, a wireless communication device 70 illustrated in FIG. 11. FIG. 11 is a schematic diagram illustrating an example of the wireless communication device 70 that implements the functions of the base station 20 or the terminal 30. The wireless communication device 70 includes, for example, a memory 71, a processor 72, an analog-to-digital converter (A/D) 73, a multiplier 74, an amplifier 75, an oscillator 76, a digital-to-analog converter (D/A) 77, a multiplier 78, an amplifier 79, and an antenna 80. Furthermore, the wireless communication device 70 may further include an interface for performing communication with external communication apparatuses through wire.

The antenna 80 receives a wireless signal and outputs the received signal to the amplifier 75. Furthermore, the antenna 80 transmits a signal output from the amplifier 79 to outside. The amplifier 75 amplifies the signal received by the antenna 80, and outputs the amplified signal to the multiplier 74. The multiplier 74 multiplies the signal output from the amplifier 75 and a clock signal output from the oscillator 76, to thereby convert the frequency of the received signal from the high-frequency band to the baseband. Then, the multiplier 74 outputs the signal subjected to the frequency conversion to the analog-to-digital converter 73. The analog-to-digital converter 73 converts the analog received signal output from the multiplier 74 into a digital received signal, and outputs the converted received signal to the processor 72.

The processor 72 controls the entire wireless communication device 70. The processor 72 may be implemented by, for example, a central processing unit (CPU), a digital signal processor (DSP), or the like. The processor 72 performs a process of receiving a signal output from the analog-to-digital converter 73. Furthermore, the processor 72 generates a transmission signal, and outputs the generated transmission signal to the digital-to-analog converter 77.

The memory 71 includes, for example, a main memory and an auxiliary memory. The main memory is, for example, a random access memory (RAM). The main memory is used as a work area of the processor 72. The auxiliary memory is, for example, a non-volatile memory such as a magnetic disk or a flash memory. The auxiliary memory stores therein various programs for operating the processor 72. The programs stored in the auxiliary memory are loaded on the main memory and executed by the processor 72.

The digital-to-analog converter 77 converts a digital transmission signal output from the processor 72 into an analog transmission signal, and outputs the converted transmission signal to the multiplier 78. The multiplier 78 multiplies the transmission signal converted by the digital-to-analog converter 77 by the clock signal output from the oscillator 76, to thereby convert the frequency of the transmission signal from the baseband to the high-frequency band. Then, the multiplier 78 outputs the transmission signal subjected to the frequency conversion to the amplifier 79. The amplifier 79 amplifies the signal output from the multiplier 78, and outputs the amplified transmission signal to outside via the antenna 80.

The oscillator 76 generates a clock signal at a predetermined frequency (an alternating-current signal in the form of a continuous wave). Then, the oscillator 76 outputs the generated clock signal to the multiplier 74 and the multiplier 78.

When the wireless communication device 70 functions as the base station 20 illustrated in FIG. 4, the antennas 216, 226, 235, and 245 illustrated in FIG. 4 are implemented by, for example, the antenna 80. Furthermore, the wireless processing units 215, 225, 234, and 244 illustrated in FIG. 4 are implemented by, for example, the analog-to-digital converter 73, the multiplier 74, the amplifier 75, the oscillator 76, the digital-to-analog converter 77, the multiplier 78, and the amplifier 79. Moreover, the other components illustrated in FIG. 4 are implemented by, for example, the processor 72 and the memory 71.

When the wireless communication device 70 functions as the terminal 30 illustrated in FIG. 5, the antenna 300 illustrated in FIG. 5 is implemented by, for example, the antenna 80. Furthermore, the wireless processing units 311, 321, 331, and 341 illustrated in FIG. 5 are implemented by, for example, the analog-to-digital converter 73, the multiplier 74, the amplifier 75, the oscillator 76, the digital-to-analog converter 77, the multiplier 78, and the amplifier 79. Moreover, the other components illustrated in FIG. 5 are implemented by, for example, the processor 72 and the memory 71.

[Others]

In the above-described embodiments, each of the UL grants includes the offset; however, as another example, the offset may be included in the permission signal. In this case, in the permission signal, the offset to be used by the terminal 30 is stored in association with the identification information of the terminal 30 serving as a destination of each of the UL grants that are transmitted before transmission of the permission signal.

Furthermore, in the above-described embodiments, the UL grant includes the identification information having the same value as the identification information included in the permission signal that is used as a reference when the terminal 30 performs the UL transmission in response to the UL grant. However, the disclosed technology is not limited to this example. For example, when each of the terminals 30 receives the permission signal from only the single base station 20, it is possible not to include, in the UL grant, the identification information having the same value as the identification information included in the permission signal.

Incidentally, the components illustrated in the above-described embodiments are distributed by each function depending on the main processing contents, in order to facilitate the understanding of the devices. Therefore, the disclosed technology is not limited by how the components are distributed or by the names of the components. The components of the devices illustrated in the above-described embodiments may be distributed into the increased number of components, or any one of the components may be distributed to perform the increased number of processes, depending on the processing contents. Furthermore, each of the processes may be implemented as a process executed by software, or may be implemented by dedicated hardware, such as an Application Specific Integrated Circuit (ASIC).

According to one aspect of the present application, it is possible to suppress a reduction in the throughput in the uplink.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station that performs wireless communication with a terminal by using a dedicated band dedicated to a wireless communication system including the base station and the terminal and a shared band shared with other systems, the base station comprising:
a transmitter configured to transmit, to the terminal using the dedicated band, a control signal including first information and second information, the first information indicating an uplink resource in the shared band to be used for data transmission by the terminal, the second information indicating a period to wait for a permission signal indicating the data transmission can be performed using the uplink resource; and
a controller configured to determine whether the shared band is idle or busy, wherein
the transmitter transmits, to the terminal via physical downlink channel, the permission signal transmitted using the shared band with different timing from the control signal, the permission signal for permitting transmission in the shared band when the controller determines that the shared band is idle, and
the control signal and/or the permission signal includes an offset indicating a time from receiving the permission signal to a start of transmission of data from the terminal to the base station with reference to the permission signal transmitted from the transmitter.

2. The base station according to claim 1, wherein the permission signal includes identification information for identifying each of permission signals in the permission signals, and
the control signal includes same identification information as the identification information included in the permission signal that is used as a reference of the offset by the terminal serving as a destination of the control signal.

3. The base station according to claim 2, wherein the identification information includes base station identification information for identifying the base station.

4. The base station according to claim 1, wherein the offset is specified in units of a subframe in Long Term Evolution (LTE).

5. A terminal that performs wireless communication with a base station by using a dedicated band dedicated to a wireless communication system including the base station and the terminal and a shared band shared with other systems, the terminal comprising:
a receiver configured to receive using the dedicated band, a control signal including first information and second information, the first information indicating an uplink resource in the shared band to be used for data transmission by the terminal, the second information indicating a period to wait for a permission signal indicating the data transmission can be performed using the uplink resource, and to receive the permission signal for permitting transmission in the shared band transmitted via physical downlink channel from the base station with different timing from the control signal; and
a transmitter configured to transmit to the base station using the uplink resource in the shared band specified by the control signal, wherein
the control signal and/or the permission signal includes an offset indicating a time from receiving the permission signal to a start of transmission of data to the base station with reference to the permission signal transmitted from the base station, and
the transmitter transmits data to the base station by using the uplink resource in the shared band specified by the control signal after a lapse of the time indicated by the offset since reception of the permission signal by the receiver.

6. The terminal according to claim 5, wherein
each of the permission signal and the control signal includes identification information, and
the transmitter transmits data to the base station after a lapse of the time indicated by the offset since reception of the permission signal including same identification information as identification information included in the control signal transmitted to the terminal.

7. The terminal according to claim 6, wherein the identification information includes base station identification information for identifying the base station.

8. The terminal according to claim 5, wherein
the transmitter cancels transmission of data to the base station when the permission signal is not received until the period indicated by the second information included in the control signal transmitted to the terminal.

9. The terminal according to claim 5, wherein the offset is specified in units of a subframe in LTE.

10. A wireless communication system comprising:
a base station; and
a terminal, wherein
the base station and the terminal perform wireless communication with each other by using a dedicated band dedicated to the wireless communication system and a shared band shared with other systems,
the base station includes:
 a first transmitter configured to transmit, to the terminal using the dedicated band, a control signal including first information and second information, the first information indicating an uplink resource in the shared band to be used for data transmission by the terminal, the second information indicating a period to wait for a permission signal indicating the data transmission can be performed using the uplink resource; and
 a controller configured to determine whether the shared band is idle or busy, wherein
 the first transmitter transmits, to the terminal via physical downlink channel, the permission signal transmitted using the shared band with different timing from the control signal, the permission signal for permitting transmission in the shared band when the controller determines that the shared band is idle, and
 the control signal includes an offset indicating a time from receiving the permission signal to a start of transmission of data from the terminal to the base station with reference to the permission signal transmitted from the first transmitter,
the terminal includes:
 a receiver configured to receive using the dedicated band, the control signal and receive using the shared band, the permission signal;
 a second transmitter configured to transmit data to the base station using the uplink resource in the shared band specified by the control signal after a lapse of the time indicated by the offset since reception of the permission signal by the receiver.

* * * * *